Jan. 12, 1937. V. F. LAMELA ET AL Re. 20,238
FAUCET WATER SOFTENER
Original Filed Oct. 25, 1932
Fig. 1.
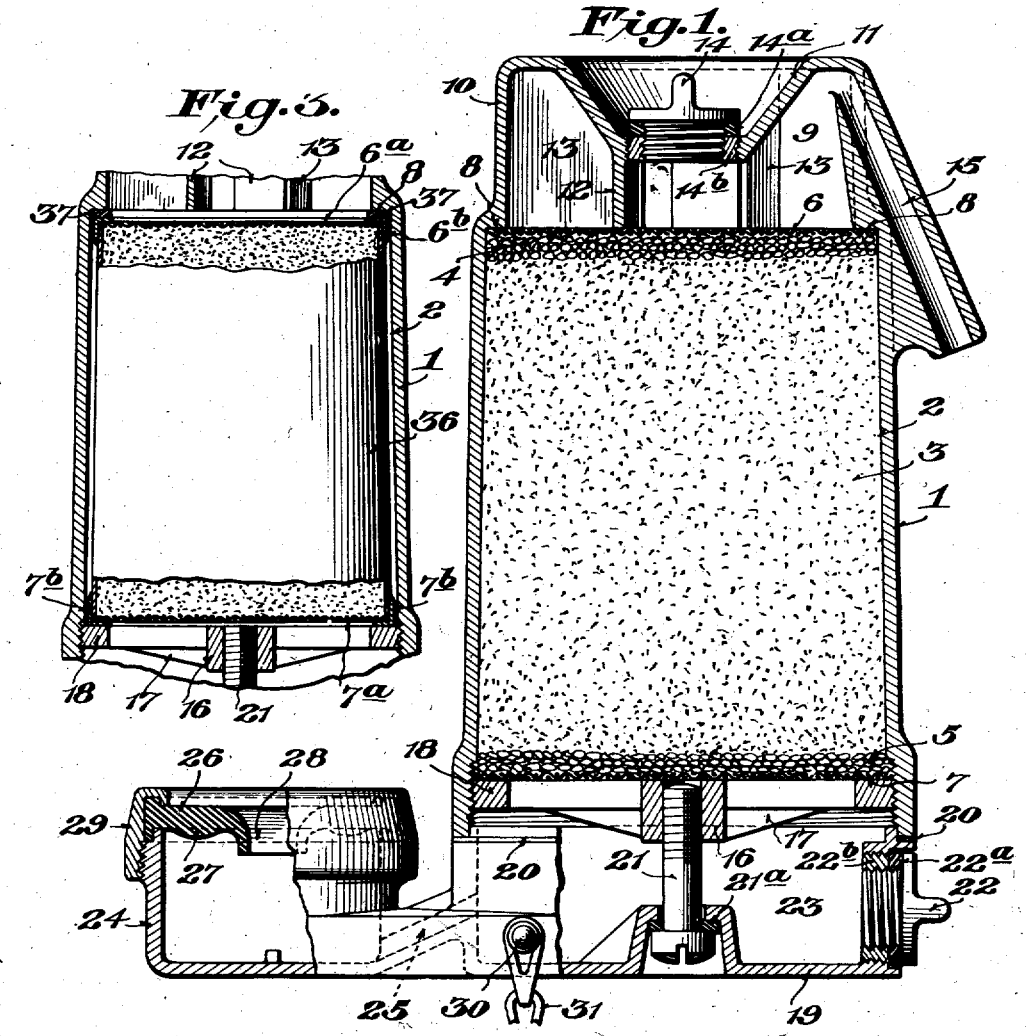
Fig. 5.
Fig. 2.
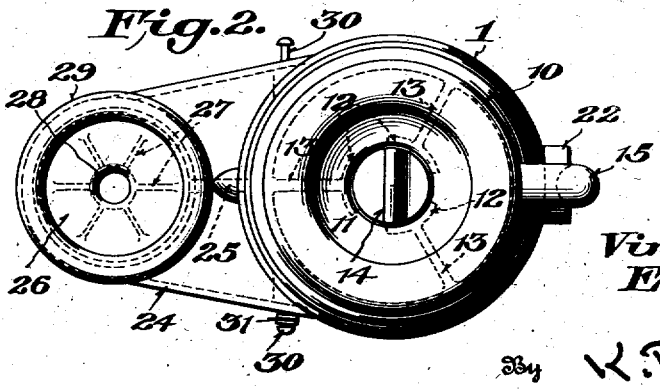
Inventors
Vincent F. Lamela,
Eric Pick,
W. S. Robertson,
By K. P. McElroy
Attorney Reissued Jan. 12, 1937 Re. 20,238

UNITED STATES PATENT OFFICE 20,238

FAUCET WATER SOFTENER

Vincent F. Lamela, Paterson, N. J., Eric Pick, New York, N. Y., and William Spencer Robertson, Madison, N. J., assignors to The Permutit Company, New York, N Y., a corporation of Delaware Original No. 1,912,943, dated June 6, 1933, Serial No. 639,494, October 25, 1932. Application for reissue October 20, 1934, Serial No. 749,316

6 Claims. (Cl. 210—24)

This invention relates to faucet water softeners, and it comprises an apparatus adapted for either permanent or temporary attachment to water faucets of ordinary type wherein a bed or body of tightly packed granular base exchange material is held in a container casing between foraminous water distributing elements at top and bottom of the bed and the container has a detachable bottom chamber casing and a top chamber casing integral with the container, the bottom chamber casing being adapted to support one of said foraminous elements and the top chamber casing having means for holding down the other of said elements, the bottom and top casings being provided with laterally extending inlet and outlet means for water, the inlet means being adapted for connection to the water faucet, and the bottom and top casings being provided with closable openings for introduction and discharge of regenerating solution; all as more fully hereinafter set forth and as claimed.

Softening water by base exchange is a well known art which has reached a high stage of development by way of large scale apparatus. A number of small scale portable water softeners have been proposed for use in connection with single water faucets in the household kitchen or bathroom or laundry but these leave much to be desired in convenience and effectiveness.

In the present invention we provide what may be termed a faucet water softener in the sense that it may be attached and connected temporarily or permanently, if desired, to the ordinary household water faucet, the softener functioning to deliver softened water in a stream as from a faucet and regeneration being readily accomplished without detachment or disconnection of the softener from the faucet. The valveless softener is in effect a continuation of the faucet.

In its usual form, our faucet water softener comprises a cortainer for the base exchange zeolite or other water softening material; the zeolite being placed in the container as a bed of tightly packed granules, held at top and bottom between two screens or other foraminous elements adapted to distribute water evenly through the bed. The container is advantageously made of metal. We have found that a container made as a die casting of aluminum alloyed with 5 per cent silicon is particularly advantageous. The container casting may be a straight walled cylinder or be slightly tapered inwardly towards the top. The container may be a die casting with a top chamber having a casing cast integrally as part of the container casing, the top casing being formed with internal ribs for holding the upper screen against displacement. The bottom portion of the container is made detachable and the lower screen is supported by a spider and ring which may be threaded for screwing into the container cylinder, there being a bottom closure member detachably connected to the spider and held thereby, this forming the casing for a chamber below the lower screen and having a water tight connection with the casing cylinder. Both the top casing and the bottom closure member have lateral extensions providing fluid inlet or outlet means in the top and bottom chambers, one of these lateral extensions being adapted for connection on its upper side to a water faucet and the other lateral extension having a spout or downward projection adapted to direct an outflowing stream of water downwardly. When the bottom lateral extension is provided with the inlet connection to the faucet the softener is adapted for softening by upward flow; when the inlet connection is through the lateral extension on the top chamber, softening is by downward flow through the tightly packed granular zeolite bed. The container is provided with means for giving substantially rigid attachment to the water faucet with which the water connection is made.

For regeneration without disconnection from the faucet, the top casing and the bottom closure member of the softener container are provided with closable openings. These closable openings may take the form of threaded holes with screw plugs which may be made of non-corrodible material such as hard rubber, or the material known under the trade name of Bakelite. Advantageously, the closable opening in the top casing is at the bottom of a funnel-shaped depression formed in the top casing. These openings permit the pouring of salt solution into the container to pass through the zeolite bed. They constitute separate means for introducing the regenerating material.

As stated ante, the bed of water softening material is packed tightly between the screens, which are held by the container at top and bottom of the bed. This permits uniform distribution of the water passing through the bed and prevents undue channeling; the capacity of the softener between regenerations being thereby materially increased. Channeling through a water softening bed has usually been prevented by leaving a free space above the bed to permit movement and classification of the granules. We have found that in a bed of small dimensions, such as we have in our faucet water softener, the softening action of fine granules of zeolite is more effective in a tightly packed bed locked at top and bottom by screens or other foraminous elements.

In assembling the softener of the present invention the zeolite is introduced through the bottom of the casing and is packed well upon the top screen which is supported by the spider arrangement of the top chamber casing. Then the bottom screen is inserted and the threaded spider is screwed into the container to hold the bottom screen. Finally the bottom closure member is put on and attached to the spider as by means of a lag screw bolt. The softener is then ready for attachment and connection to a water faucet.

In most cases the mechanical wear upon the zeolite in water softening is slight and a bed may last for an indefinitely long time without requiring renewal. However, in the case of a locked bed, suspended matter carried by the water will gradually penetrate into the bed. When a substantial amount of impurities has been accumulated in this manner it will, to some extent, interfere with proper functioning of the apparatus. This condition can be remedied by removing the zeolite from the container, washing it and repacking it into the container. Such procedure, however, is cumbersome and, the quantity of zeolite involved being relatively small, we prefer to provide a new bed contained in a metallic cartridge with fine screens forming the top and bottom. This cartridge can be inserted in the container casing in place of the original bed and screens, and guarded against by passing or short circuiting of the water flow around the cartridge by means of one or more gaskets placed between the cartridge and the container.

In the accompanying drawing we have shown more or less diagrammatically typical embodiments of our invention. In this showing, Fig. 1 is a view in vertical section, partly in elevation, of a faucet water softener such as described;

Fig. 2 is a top plan view of the softener of Fig. 1; and

Fig. 3 is a view in elevation partly broken away and showing parts in section of a softener containing a cartridge refill.

Referring to the figures, a container casing 1 of cast metal and of circular cross section encloses a softening chamber 2 containing a packed bed 3 of granular water softening zeolite or other granular base exchange material. At the top and bottom of this packed bed or body are layers 4 and 5 of zeolite of coarser grain than that of the main body. Above and below these layers are wire screens 6 and 7 which hold the zeolite bed and prevent movement thereof. As shown, the top screen 6 is held against a shoulder 8 formed in the container casing. Above the upper screen 6 is a chamber 9 enclosed in a top chamber casing 10, which, as shown, is integral with the casing 1. Top casing 10 is formed with a depression in its top forming a funnel 11, and depending from this funnel are members 12 having ribs 13 extending from the members 12 to the side walls of the top casing. These members and ribs together with shoulder 8 form a spider serving to hold screen 6 against upward bulging movement. The lower portion of funnel 11 is provided with a threaded opening closed by a gasket 14a and a screw plug 14, which is advantageously made of a non-corrodible composition such as that known under the trade name of "Bakelite". The top chamber 9 is provided with a water outlet 15 which extends laterally downward from near the top of casing 10 and is open to the atmosphere.

The bottom screen 7 is supported by a spider 16 having ribs 17 and a ring 18 threaded into the casing 1. The screen and spider form a removable partition in the casing. A bottom closure member 19 is held in water tight engagement with the bottom edge of the casing 1 by lag screw 21 screwed into spider 16 with an interposed gasket 20 between member 19 and casing 1. A gasket 21a prevents leakage around the screw. In the side of the closure member 19 is a threaded opening closed by a gasket 22a and a screw plug 22 made of non-corrodible material. The plugs 14 and 22 are advantageously screwed into brass inserts 14b and 22b respectively. These inserts, knurled on the outside and threaded on the inside, are placed in the casting mould and the melted metal is poured around them so that the metal interlocks with the knurling, making the insert and the casting integral. The bottom closure member encloses a chamber 23 and is formed with a lateral extension 24 with an enclosed passage 25 to chamber 23, which serves as an inlet distributing chamber. It is advantageous to have passage 25 smaller in cross section than outlet 15. Fitted in the top of the lateral extension 24 is a rubber member 26 having reinforcing ribs 27 and a central aperture 28 adapted to fit tightly over the mouth of a water faucet. The rubber member is held in place by a cap 29 screwed upon the lateral extension 24. The arrangement serves to make a water tight connection with an ordinary water faucet. The bottom closure member is provided with pins 30. In connection with these pins a chain 31 serves for attachment of the softener to the water faucet with which water connection is made through rubber member 26.

In assembling the softener the casing is held upside-down with the bottom closure and spider removed and the screen 6 is inserted and placed against shoulder 8 and the holding members 12. Then the layer 4 of relatively coarse grained zeolite is placed upon screen 6 and finer grained zeolite is packed tightly into the container. The packing can be done in various ways. The zeolite can be put in in small portions and each portion tamped down by a wooden plug or the like. Or the zeolite may be placed in the container and shaken down and forced down by a plate screwed down by the spider. After the finer zeolite has been packed down the coarse layer 5 is put in and then screen 7 is secured by screwing in the spider. The bottom closure member is then attached by screwing in lag screw 21 and the softener is then ready for attachment and connection to a faucet.

In operation, the water issuing from the faucet is softened in its passage through the zeolite bed and softened water is discharged through outlet spout 15. Chamber 23 acts in cooperation with screen 7 to distribute incoming water through the zeolite bed. When the softening power of the zeolite becomes exhausted in use, the zeolite is regenerated by removing plugs 14 and 22 and pouring salt solution through the zeolite bed, the water faucet being turned off during regeneration. The softener may be allowed to stand for some time after pouring in the salt solution, the plugs are replaced and the remaining salt solution is then rinsed out by opening the faucet for a few moments and allowing the water from the faucet to pass through the softener. Ordinarily, with a zeolite bed for example about 3 inches in diameter by 4 to 5 inches deep, about 4 tablespoons of salt dissolved in a quart of water suffice for regeneration with a quart of water for rinsing.

In Fig. 3 is shown means which may be used for replacing or renewing the zeolite bed in the softener. Such means comprise a metallic cartridge 36 of circular cross section, fitting closely in the cylindrical casing 1. The cartridge may be made of thin sheet metal with its top formed of a screen 6a and its bottom of a screen 7a. These screens are advantageously held by cartridge caps 6b and 7b soldered to the cartridge, one of the caps being soldered after the cartridge has been packed full of granular zeolite. In replacing the zeolite bed in chamber 2 the cartridge is inserted with a gasket 37 interposed between the cartridge and shoulder 8 and the cartridge is held in place by spider 16 with its ring 18 screwed into casing 1.

While we have described our invention in connection with its particular use for water softening it is apparent that it may also be used for other purposes such as water filtration. For such use the casing 1 or the cartridge 36 is filled with a filtering material such as sand or activated carbon. The main body of the filtering material may be fine with layers at the top and bottom of coarse material. In some cases it may be advantageous to fill the casing 1 or the cartridge 36 with a layer of zeolite and a layer of activated carbon. It is to be noted that when the activity of the activated carbon layers is spent, this activity of the carbon may be restored and the filter sterilized by removing the plugs 14 and 22 and pouring through a solution of sodium hypochlorite.

What we claim is:—

1. A portable water softener adapted for attachment and connection to a water faucet and comprising a softening chamber containing a body of packed granules of base exchange material, two foraminous water distributing elements holding said body at top and bottom, two members holding said foraminous elements so as to lock said body against movement both at top and bottom, the top holding member being integral with the chamber casing and the bottom member being a spider screwed to the chamber casing and supporting the bottom foraminous element, a bottom closure member for said chamber attached to the spider and having laterally extending means for connecting the chamber at a point below said locked body to the water faucet, outlet means extending laterally downward from the chamber at a point above said locked body and two closable openings in the chamber respectively above and below said locked body and adapted respectively to introduce and discharge regenerating solution.

2. In a portable apparatus for passing water to be softened or otherwise purified through a bed of material, said apparatus being adapted for attachment to a water faucet, a cast metal container for the water treating bed, two water distributing screens held in the container at bottom and top of said bed, a spider screwed into the container and adapted to supp rt the bottom screen, a bottom closure member enclosing a space below the bed, said member being detachably connected to the spider so as to be held in water tight engagement with the edges of the container, liquid inlet means laterally extending from said closure member and adapted for direct connection with the water faucet, a top chamber with a casing cast integrally with the container and having transverse ribs to hold the top screen against displacement and liquid outlet means extending laterally downward from the top chamber casing.

3. In a faucet water softener in which water from the faucet is passed through a locked body of granular water softening material held in a container between two foraminous water distributing elements supported respectively by a top holding member integral with the container casing and by a detachable spider threaded into the container casing at the bottom, means for replacing and renewing said body of granular material which comprises a thin walled cartridge tightly packed with said granular material and having a foraminous top and a foraminous bottom forming integral parts of the cartridge, said cartridge fitting closely into the container casing and being held against the top holding member by the threaded spider at the bottom, and means interposed between the cartridge and the container casing to prevent bypassing of the water flow around the cartridge.

4. A portable water treating apparatus adapted for attachment and connection to a water faucet and comprising a water treatment chamber, a removable thin walled cartridge packed tightly with granular water treating material and fitting closely into the chamber, said cartridge having an integral foraminous top and an integral foraminous bottom, two spider members holding said cartridge at the foraminous top and bottom, one of said spider members being integral with the chamber casing and the other being threaded into the casing so as to hold the cartridge against the first spider member, a gasket interposed between the cartridge and the chamber casing and held by the threaded spider to prevent bypassing of the water flow around the cartridge, a removable closure member for the chamber attached to the threaded spider, laterally extending means for passing water into said chamber and laterally extending means for passing water out of said chamber, one of said means having communication with said chamber above the top of said cartridge and the other of said means having communication with said chamber below the bottom of said cartridge.

5. A portable water treating apparatus adapted for attachment to a water faucet and comprising a chamber containing a bed of granular water treating material, two foraminous distributing elements holding said bed at top and bottom, two spider members holding said foraminous elements so as to lock said bed against movement both at top and bottom, one of said spider members being integral with the chamber casing and the other being screwed to the casing and supporting its respective foraminous element, a closure member for said chamber attached to the screwed spider, laterally extending means for connecting the chamber to the water faucet, outlet means in the chamber, one of said means being connected to the chamber above said bed and the other of said means being connected to the chamber below said bed, and two closable openings in the chamber respectively above and below said locked bed and adapted to introduce and discharge regenerating solution.

6. A valveless portable regenerative upflow base exchange water softener adapted for connection to a water faucet and comprising a container, a closed water softening chamber in said container for holding a body of granules of base exchange material packed in said chamber and locked against movement of the body, a second chamber in said container below said softening chamber and serving as an inlet water distributing chamber, said distributing chamber having an opening formed in an outer wall, removable closure means cooperating with the opening, a movable partition held in said container to define the two chambers and to lock said packed granule body in a fixed position in the softening chamber, foraminous water distributing means in said partition, a removable closure forming the bottom of said second chamber and permitting removal of said partition, laterally extending inlet means in a side wall of the water distributing chamber adapted for connection to a water faucet and outlet means for softened water open to the atmosphere and having communication with the softening chamber at its top.

VINCENT F. LAMELA.
ERIC PICK.
WILLIAM SPENCER ROBERTSON.